(12) United States Patent
Meyer et al.

(10) Patent No.: US 10,478,744 B2
(45) Date of Patent: Nov. 19, 2019

(54) RAILWAY BOGIE WITH A WINTERPROOF PIPING AND WIRING PROTECTING IMPACT GUARD

(71) Applicant: ALSTOM TRANSPORT TECHNOLOGIES, Saint-Ouen (FR)

(72) Inventors: Ulrich Meyer, Salzgitter (DE); Holger Kaufmann, Magdeburg (DE); Michael Kulp, Hüttenrode (DE)

(73) Assignee: Alstom Transport Technologies, Saint-Ouen (FR)

( * ) Notice: Subject to any disclaimer, the term of this patent is extended or adjusted under 35 U.S.C. 154(b) by 0 days.

(21) Appl. No.: 15/191,272

(22) Filed: Jun. 23, 2016

(65) Prior Publication Data

US 2016/0375914 A1 Dec. 29, 2016

(30) Foreign Application Priority Data

Jun. 23, 2015 (EP) .................................. 15305964

(51) Int. Cl.
| | | |
|---|---|---|
| *B01D 1/00* | (2006.01) | |
| *C02F 1/14* | (2006.01) | |
| *C02F 1/18* | (2006.01) | |
| *B61F 19/06* | (2006.01) | |
| *C02F 103/08* | (2006.01) | |
| *C02F 103/00* | (2006.01) | |
| *B61F 5/52* | (2006.01) | |

(52) U.S. Cl.
CPC ............ *B01D 1/0005* (2013.01); *B61F 19/06* (2013.01); *C02F 1/14* (2013.01); *C02F 1/18* (2013.01); *B61F 5/52* (2013.01); *C02F 2103/007* (2013.01); *C02F 2103/08* (2013.01)

(58) Field of Classification Search
CPC .. B61F 5/52; B61F 19/00; B61F 19/02; B61F 19/04
See application file for complete search history.

(56) References Cited

U.S. PATENT DOCUMENTS

| | | | | |
|---|---|---|---|---|
| 5,671,685 A | * | 9/1997 | Ughi | ..................... E01B 19/003 |
| | | | | 105/1.1 |
| 9,336,936 B1 | * | 5/2016 | Smith | ................... H01F 7/0257 |
| 9,469,314 B2 | * | 10/2016 | Haas | ....................... B61F 19/06 |
| 2009/0095193 A1 | * | 4/2009 | Roop | ..................... B61B 13/04 |
| | | | | 105/1.1 |

(Continued)

FOREIGN PATENT DOCUMENTS

| | | |
|---|---|---|
| DE | 102004041090 A1 | 3/2006 |
| DE | 102006004814 A1 | 6/2007 |

(Continued)

OTHER PUBLICATIONS

European Search Report dated Jan. 4, 2016 in corresponding EP application No. 15305964.7.

*Primary Examiner* — Jason C Smith
(74) *Attorney, Agent, or Firm* — Knobbe, Martens, Olson & Bear, LLP

(57) ABSTRACT

A railway bogie includes one or more operative components for the operation of the railway bogie and an impact guard protecting the one or more operative components from flying debris. The impact guard is made of a high density polyethylene (HDPE). The railway bogie can be used in Jacobs bogies of multiple units operating under wintery conditions.

16 Claims, 4 Drawing Sheets

(56) References Cited

U.S. PATENT DOCUMENTS

| | | | | |
|---|---|---|---|---|
| 2010/0127133 | A1* | 5/2010 | Schrevere | B61F 19/00 246/169 S |
| 2011/0297035 | A1* | 12/2011 | Langerwisch | B61D 17/02 105/1.1 |
| 2013/0239844 | A1* | 9/2013 | Schober | B61D 17/02 105/1.2 |
| 2013/0291758 | A1* | 11/2013 | Orellano | B61D 17/02 105/1.1 |
| 2013/0291759 | A1* | 11/2013 | Orellano | B61D 17/02 105/1.1 |
| 2014/0238261 | A1* | 8/2014 | Hidai | B61D 17/02 105/1.2 |
| 2015/0059612 | A1* | 3/2015 | Calomfirescu | B61F 19/00 105/392.5 |
| 2015/0232107 | A1* | 8/2015 | Haas | B61F 19/00 293/112 |
| 2016/0375914 | A1* | 12/2016 | Meyer | B61F 5/52 105/182.1 |
| 2016/0375916 | A1* | 12/2016 | Zanghelli | B61F 19/00 295/37 |

FOREIGN PATENT DOCUMENTS

| | | |
|---|---|---|
| EP | 2368781 A1 | 9/2011 |
| EP | 2500194 A2 | 9/2012 |
| FR | 2699878 | 7/1994 |

\* cited by examiner

RAILWAY BOGIE WITH A WINTERPROOF PIPING AND WIRING PROTECTING IMPACT GUARD

CROSS-REFERENCE TO RELATED APPLICATIONS

This application claims priority to Patent Application No. EP 15305964.7 filed on Jun. 23, 2015, the disclosure of which including the specification, the drawings, and the claims is hereby incorporated by reference in its entirety.

FIELD OF THE INVENTION

The present invention concerns a railway bogie with a winterproof impact guard.

BACKGROUND OF THE INVENTION

A railway bogie holds various kinds of operative components such as electrical and mechanical wiring and fluid piping, and many of them are exposed. Therefore, such equipment is likely to be damaged by chunks of ice, small stones, small animals etc. In particular, the wires and pipes under a railway bogie are easily damaged in winter or in a cold region due to the chunks of ice and accumulation of ice and snow. Accordingly, when railway vehicles operate under wintery conditions, their bogies must be winterised to prevent the bogie equipment from being damaged.

Conventionally, the applicant has used bent stainless steel sheets as winterproof impact guards for the bogies of its multiple units sold under the name Alstom Coradia Nordic. The steel sheets have high strength and are thereby suitable as impact guards. In addition, the steel sheets can be bent to appropriately cover otherwise exposed equipment under a railway bogie.

However, this known steel sheet solution is not very satisfactory. Indeed, upon impact, the steel sheets are prone to plastic deformation. Accordingly, they need to be replaced frequently. In addition, when a steel sheet is strongly deformed, it often damages or destroys the wires and pipes behind, which it is supposed to protect. That is to say, it is sometimes even necessary to replace not only the distorted steel sheet but also the wires, pipes and hoses after a collision. Due to the high stiffness of the folded steel sheets, the supporting secondary structure may also be damaged, which then needs to be repaired as well. Moreover, a metal fatigue fracture of the steel sheet may occur at its bend.

SUMMARY OF THE INVENTION

Therefore, it is an object of the present invention to provide a railway bogie with an improved impact guard for protecting bogie components such as wires and pipes under wintery conditions.

This object is achieved with a railway bogie comprising:
one or more operative components for the operation of the railway bogie; and
an impact guard protecting the one or more operative components from flying debris,
wherein the impact guard is made of a high density polyethylene (HDPE).

By using HDPE as the material for the impact guard, the affinity between snow or ice and the impact guard surfaces is reduced. Also, HDPE has a lower thermal conductivity than steel. Thus, there is less ice and snow accumulation on the impact guard. Furthermore, thanks to the good elasticity of the high density polyethylene (HDPE), the impact guard returns to its original shape after impacts of ice, snow, small stones and the like. Therefore, the damage in the secondary structure can be minimized. Overall, the invention reduces the costs for repairing damaged impact guards and damaged equipment such as wires, pipes and hoses.

The applicant surprisingly found out that HDPE can be successfully used in the construction of railway bogies. So far, bogie manufacturers always have refused to use plastics for railway bogies because of the purported inadequate properties of plastic compared to metal, and in particular steel.

According to other advantageous aspects of the invention, the railway bogie comprises one or more of the following features taken alone or according to all technically possible combinations:
the impact guard is made of ultra-high-molecular-weight polyethylene (UHMW-PE);
the impact guard is a solid milled slat;
the impact guard includes a base and at least one stiffening ridge extending at a substantially right angle from the periphery of the base;
the impact guard has an L-shaped, U-shaped or rectangular cross-section;
the impact guard is made of one piece and extends substantially across the entire width of the bogie;
the impact guard is black;
the impact guard includes at least one cut-out adapted to receive a bogie component;
the railway bogie includes a bogie frame with two side beams and two end beams extending between the side beams, and wherein the impact guard is fastened to one of the end beams, and is preferably fastened to the underside of the end beam;
said one or more operative components are one or more cables and/or fluid pipes, in particular air brake piping, which are covered by the impact guard;
the railway bogie is a traction bogie or a trailer bogie, in particular a Jacobs traction bogie or a Jacobs trailer bogie.

The invention also relates to a diesel or electric multiple unit comprising at least one railway bogie as defined above.

BRIEF DESCRIPTION OF THE DRAWINGS

The invention will be better understood when reading the following description, which is given solely by way of example and with reference to the appended drawings, in which.

DETAILED DESCRIPTION OF THE PREFERRED EMBODIMENTS

The inventive impact guards are made of a particular plastic (synthetic resin). The plastic used for the impact guards must not become brittle and remain pliable at wintery temperatures, i.e. temperatures down to −50° C. The plastic must also have high impact strength and a low strain at yield stress. On top of that, the plastic must have low ice and snow adhesion. As a result of extensive testing, the applicant has found out that high density polyethylene (HDPE) meets these requirements. HDPE is therefore the material of choice for the impact guards according to the invention. Ultra-High-Molecular-Weight polyethylene (UHMW-PE or PE 1000) is a HDPE that is particularly well suited for making the inventive impact guards. The most preferred material for the impact guards is newly manufactured PE1000. However, reprocessed or recycled PE1000, sometimes referred to as PE1000R, may also be used. Preferably, black is chosen as the colour for the HDPE since black provides good protection against deterioration through ultraviolet (UV) radiation.

Figure 1:
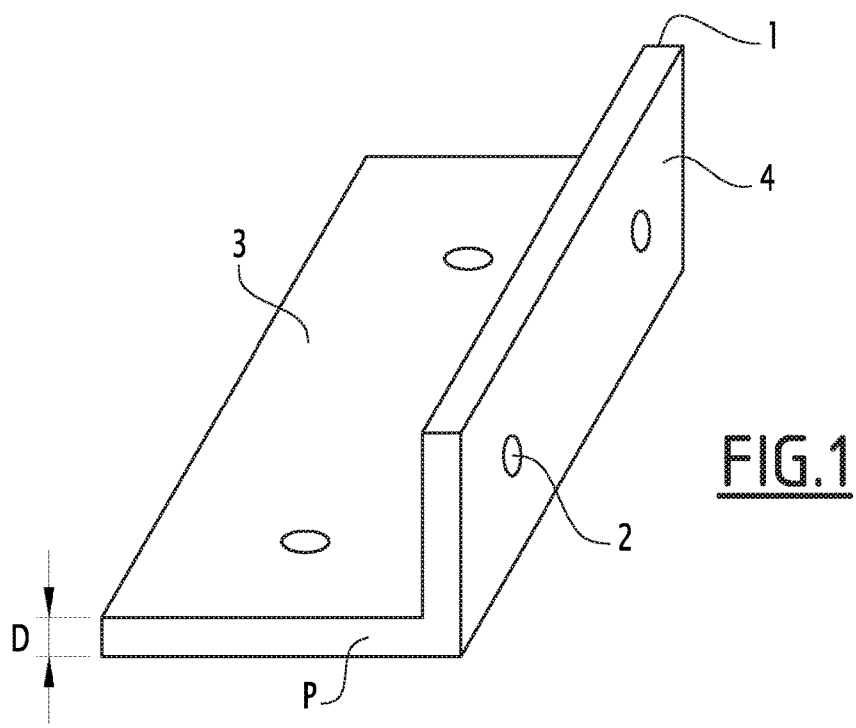
FIG. 1 is a perspective view showing a first example of an inventive impact guard for protecting wires and/or pipes under a railway bogie.

FIG. 1 is a perspective diagram showing a first example 1 of an impact guard for protecting wires and/or pipes under a railway bogie. Impact guard 1 has the general shape of a slat. It has an L-shaped cross-section. It is made of a solid or monolithic piece of material. Preferably, the thickness D of the impact guard 1 is about 10 mm.

As shown in FIG. 1, the impact guard 1 has a plurality of fastening holes 2. The impact guard 1 can be installed on an existing holder under a railway bogie using bolts, washers and nuts and the fastening holes 2.

The impact guard 1 includes a base 3 and at least one stiffening ridge 4 extending at a substantially right angle from the periphery P of the base 3. In FIG. 1, there is only one stiffening ridge 4 formed at one side of the impact guard base's periphery P. The stiffening ridge 4 increases the rigidity and thus the impact strength of the impact guard 1.

Figure 2:
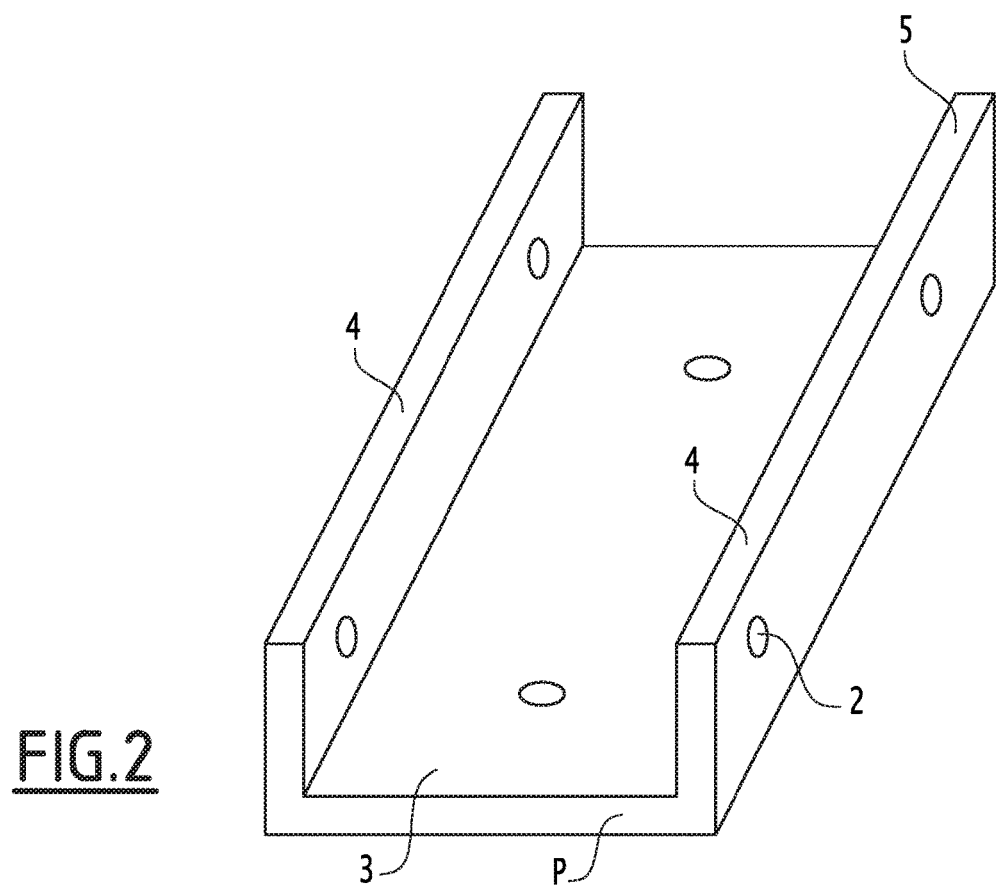
FIG. 2 is a perspective view showing a second example of an inventive impact guard for protecting wires and/or pipes under a railway bogie.

FIG. 2 is a perspective diagram showing a second example 5 of an inventive impact guard for protecting wires and/or pipes under a railway bogie. The impact guard 5 has a U-shaped cross-section. It includes two lateral stiffening ridges 4. The two stiffening ridges 4 extend on two opposite sides of the impact guard 5 at a substantially right angle from the periphery P of the impact guard's base 3.

Figure 3:
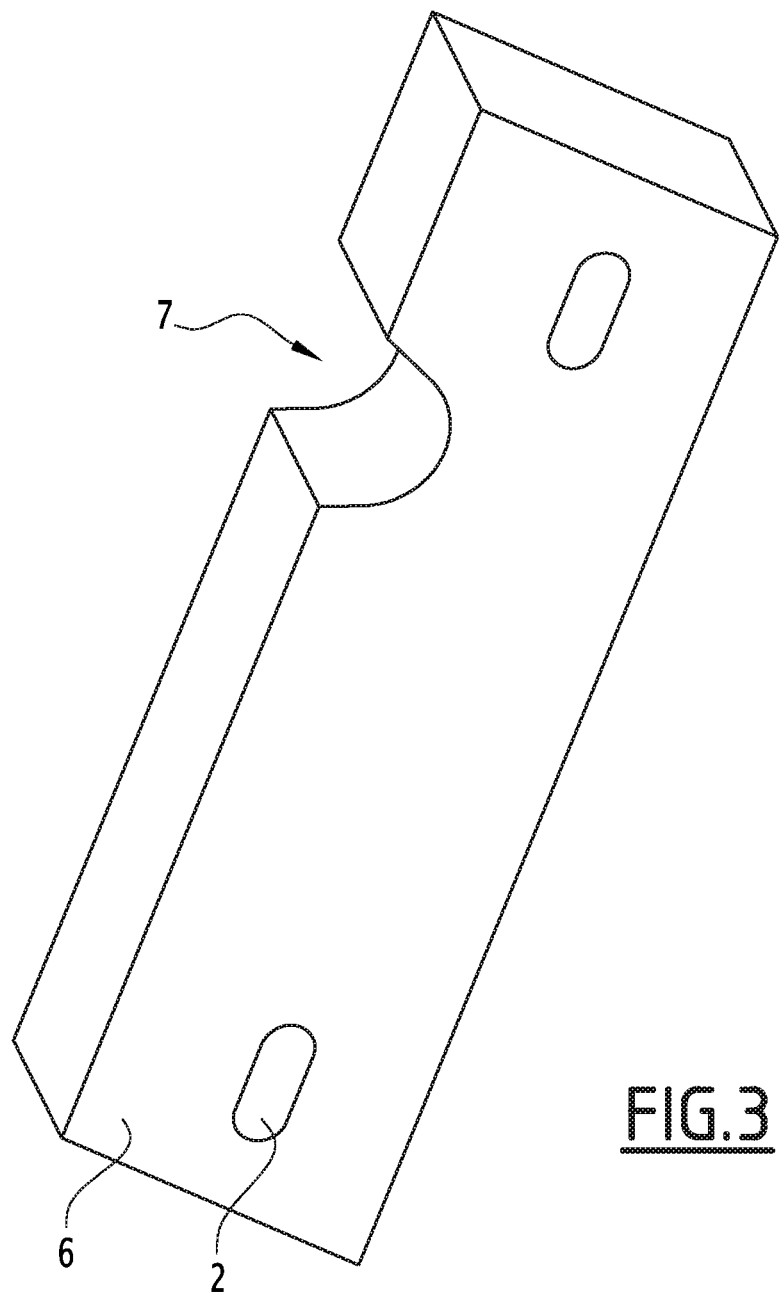
FIG. 3 is a perspective view showing a third example of an inventive impact guard for protecting wires and/or pipes under a railway bogie.

FIG. 3 is a perspective view of a third example 6 of an inventive impact guard. Impact guard 6 has a rectangular cross-section. Impact guard 6 has a substantially cuboid shape. It includes a curved cut-out 7 adapted to receive a bogie component, such as a pipe or a cable.

The impact guards 1, 5 and 6 of FIGS. 1 to 3 are formed by milling from a large HDPE sheet, preferably with an initial thickness of around 20 mm. Hence, the manufacture of the inventive impact guards does not involve any bending as was the case for the conventional steel impact guards. Consequently, the strength of the inventive impact guards is improved.

Figure 4:
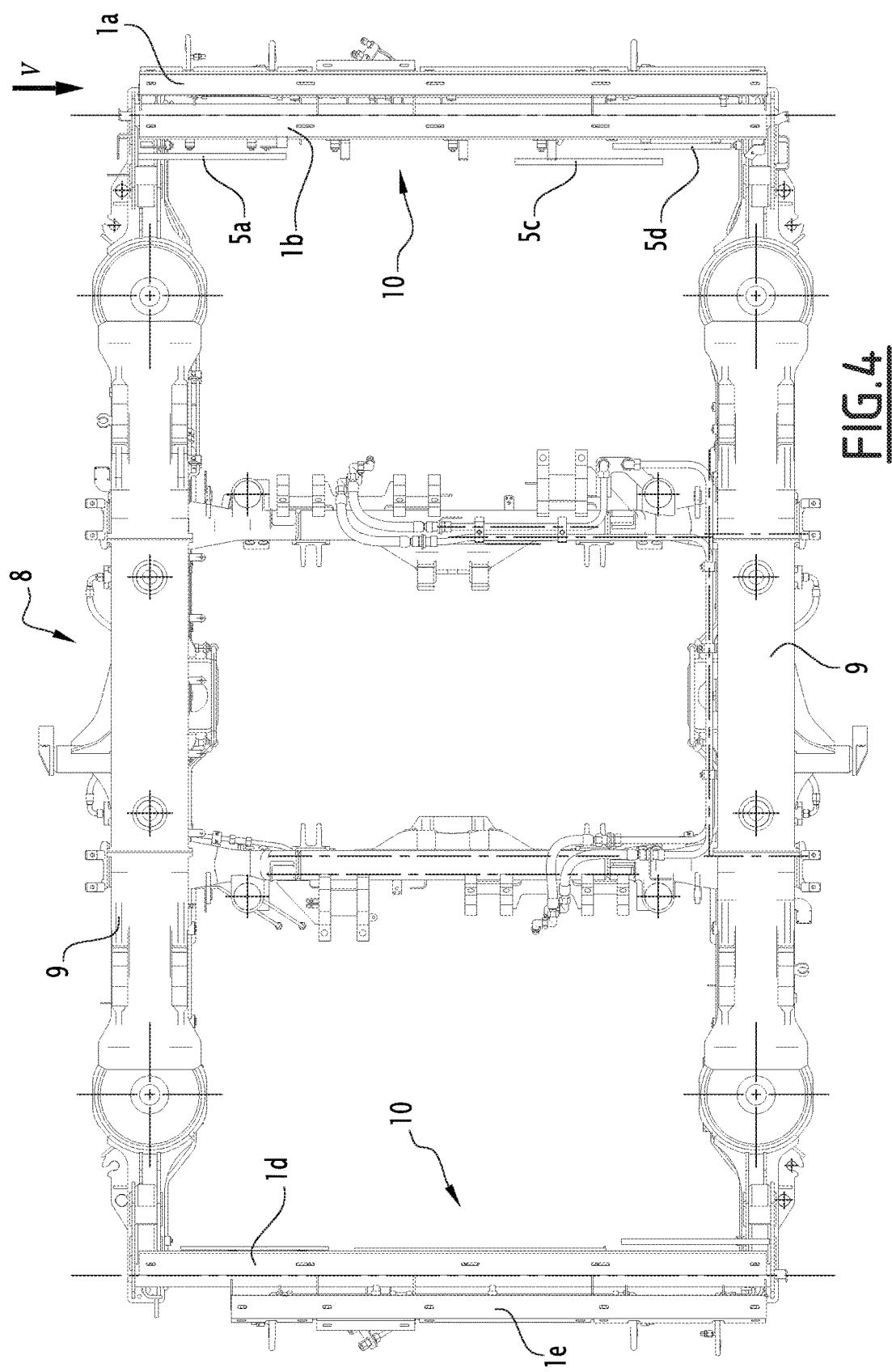
FIG. 4 is a view from below of an inventive railway bogie frame that is fitted with the inventive impact guards at its end beams.

FIG. 4 is a view from below of an inventive bogie frame 8. The frame 8 can be part of a traction bogie or a trailer bogie, in particular a Jacobs traction bogie or a Jacobs trailer bogie. Preferably, the bogie frame 8 is used in a diesel or electric multiple unit, in particular for suburban or regional passenger transport.

The bogie frame 8 has two longitudinal side beams 9 and two transverse end beams 10 extending between the side beams 9. When the bogie frame 8 is in operation in a moving train, the end beams 10 are typically areas of air turbulence and thus snow accumulation in case of wintery conditions, and the end beams 10 are frequently hit by debris flying off the railway track. The end beams 10 and the operative components attached thereto are protected from these environmental stresses by several inventive impact guards 1a to 1e and 5a to 5d. The impact guards 1a to 1e are of the type shown in FIG. 1. The impact guards 5a to 5d are of the type shown in FIG. 2. The impact guards 1a, 1b and 1d extend substantially across the entire width of the bogie frame 8.

More generally, the impact guards need only protect areas of the bogie that are exposed to flying debris, snow, ice or other risks. For example, in the case of a traction bogie, the parts close to the engine and gears do not normally need to be covered by the inventive impact guards since they are usually quite hot and located in the upper parts of the bogie.

Figure 5:
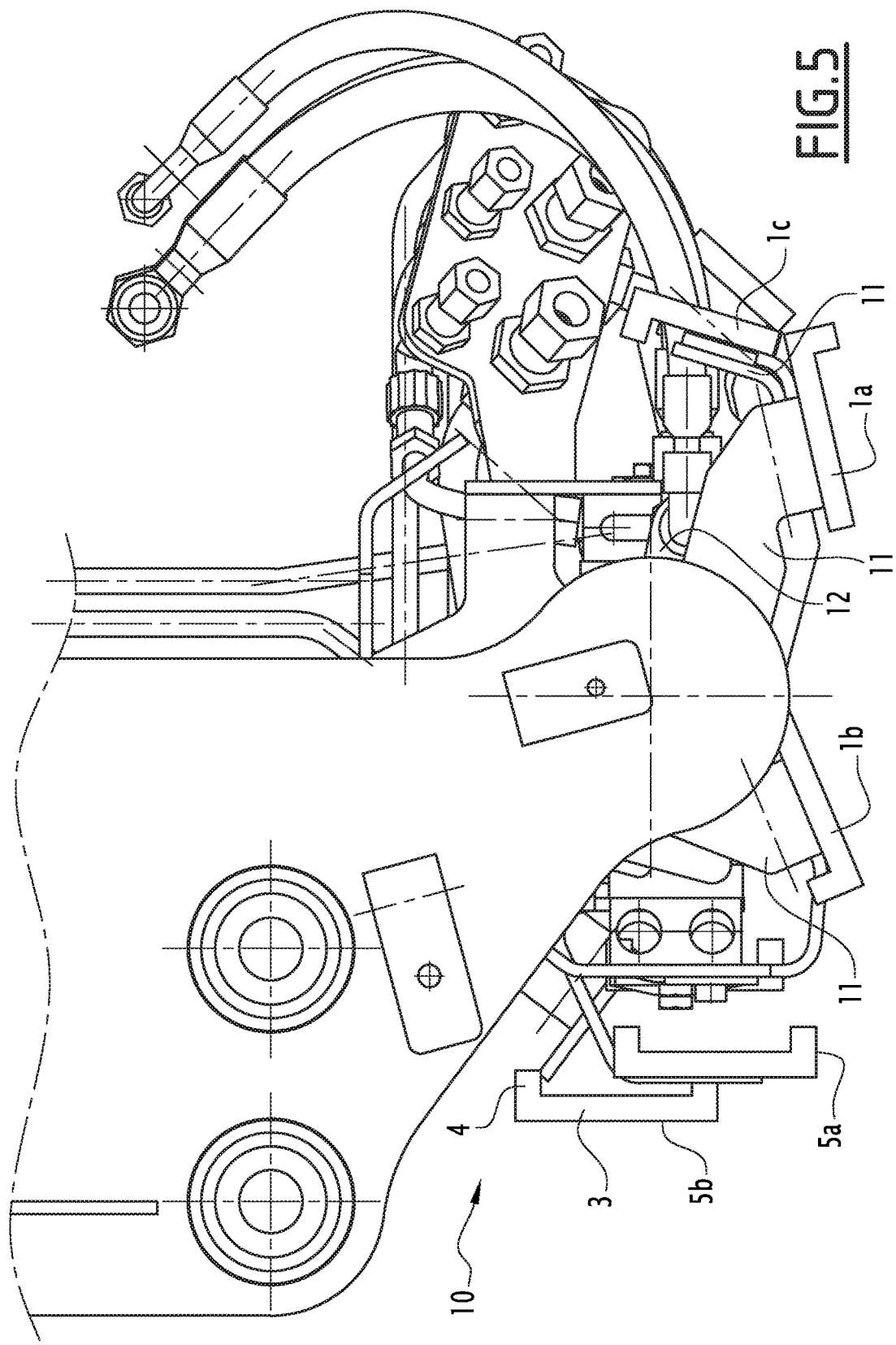
FIG. 5 is an enlarged fragmentary side view of the bogie frame of FIG. 4 according to arrow V, showing the arrangement of the inventive impact guards on the end beam in more detail.

The enlarged fragmentary bogie frame side view of FIG. 5 shows the exact arrangement of impact guards 1a to 1c and 5a, 5b on the end beam 10 in more detail. The impact guards 1a to 1c and 5a, 5b are fastened to the end beam 10 via holders or brackets 11. Impact guards 1a and 1c cover and thus protect an operative component, namely an air brake pipe 12 running along the end beam 10.

A conventional bogie with impact guards made of steel can be easily equipped with the improved impact guards of the present invention. Indeed, the holders and fastening means of the steel impact guards can be reused for fastening the new plastic impact guards to the bogie. This is done with the following procedure:

1. Take away the old steel impact guards, screws, washers and nuts. 2. Clean the impact guard receiving areas from rough dirt. 3. Install the new HDPE impact guards on the existing holders using the removed screws, washers and nuts. 4. Apply a lubricant such as Molykote® on the screws. 5. Tighten the screws until the washers slightly grab into the HDPE.

What is claimed is:

1. A railway bogie, comprising:
   one or more operative components for the operation of the railway bogie; and
   a first impact guard and a second impact guard protecting the one or more operative components from flying debris under wintery conditions, wherein each of the first and second impact guards comprises a plurality of fastening holes and each of the plurality of first and second impact guards is fastened to one of the end beams via the holders or brackets using bolts, washers and nuts and the fastening holes,
   wherein the impact guard is made of a high density polyethylene (HDPE),
   the impact guard is a solid milled slat,
   the impact guard includes a base and at least one stiffening ridge extending at a substantially right angle from the periphery (P) of the base,
   the railway bogie includes a bogie frame with two side beams and two end beams extending between the side beams, and
   the impact guard is fastened to one of the end beams.

2. The railway bogie according to claim 1, wherein the impact guard has an L-shaped, U-shaped or rectangular cross-section.

3. The railway bogie according to claim 1, wherein the impact guard is made of one piece and extends substantially across the entire width of the bogie.

4. The railway bogie according to claim 1, wherein the impact guard is black.

5. The railway bogie according to claim 1, wherein the impact guard includes at least one cut-out adapted to receive a bogie component.

6. The railway bogie according to claim 1, wherein the impact guard is fastened to the underside of the end beam.

7. The railway bogie according to claim 1, wherein said one or more operative components are one or more cables or fluid pipes, which are covered by the impact guard.

8. The railway bogie according to claim 7, wherein said one or more operative components are air brake piping.

9. The railway bogie according to claim 1, the railway bogie being a traction bogie or a trailer bogie.

10. The railway bogie according to claim 9, the railway bogie being a Jacobs traction bogie or a Jacobs trailer bogie.

11. A diesel or electric multiple unit comprising at least one railway bogie according to claim 1.

12. The railway bogie according to claim 1, further comprising at least one third impact guard, wherein the third impact guard is a solid milled slat made of HDPE having a rectangular cross-section and a substantially cuboid shape, wherein the third impact guard comprises a curved cut-out through which a pipe or a cable is received.

13. A railway bogie comprising:
one or more operative components for the operation of the railway bogie; and
a plurality of first impact guards and a plurality of second impact guards, said first and second impact guards configured to protect the one or more operative components from flying debris under wintery conditions,
wherein the first and second impact guards are made of a high density polyethylene (HDPE),
each of the first and second impact guards is a solid milled slat,
each of the first impact guards comprises:
a base, and
a single stiffening ridge extending at a substantially right angle from the periphery of the base at a side of the first impact guard,
each of the second impact guards comprises:
a base, and
at least two stiffening ridges extending at a substantially right angle from the periphery of the base, with a stiffening ridge at each of opposite sides of the second impact guard
the railway bogie includes a bogie frame with two side beams and two end beams extending between the side beams,
the one or more operative components comprise an air brake running along one of the end beans, and at least some of the first impact guards are configured to protect said air brake pipe,
at least some of the first impact guards extend substantially across an entire width of the bogie frame, and
each of the plurality of first and second impact guards is fastened to one of the end beams via holders or brackets.

14. The railway bogie according to claim 13, wherein each of the first and second impact guards comprises a plurality of fastening holes and each of the plurality of first and second impact guards is fastened to one of the end beams via the holders or brackets using bolts, washers and nuts and the fastening holed.

15. The railway bogie according to claim 13, further comprising at least one third impact guard, wherein the third impact guard is a solid milled slat made of HDPE having a rectangular cross-section and a substantially cuboid shape, wherein the third impact guard comprises a curved cut-out through which a pipe or a cable is received.

16. The railway bogie according to claim 1, wherein the impact guard is made of ultra-high-molecular-weight polyethylene (UHMW-PE).

* * * * *